Sept. 14, 1965     R. DE STEFANI     3,205,826
ELECTROMAGNETIC VIBRATION PUMPS
Filed April 26, 1963
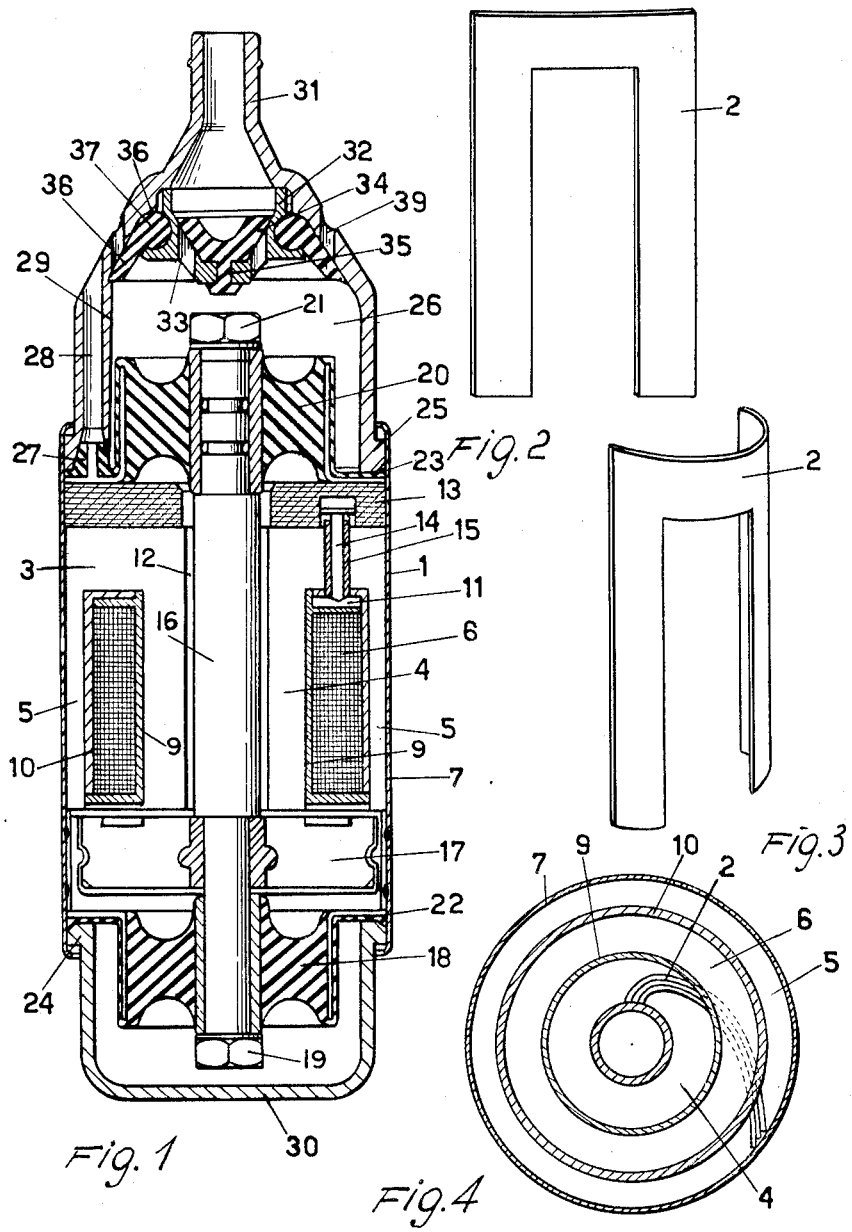
INVENTOR
Roberto de Stefani
BY Michael S. Striker
ATTORNEY

United States Patent Office 3,205,826
Patented Sept. 14, 1965

3,205,826
ELECTROMAGNETIC VIBRATION PUMPS
Roberto De Stefani, Via G Verdi 7, Cusano Milanino, Milan, Italy
Filed Apr. 26, 1963, Ser. No. 275,993
Claims priority, application Italy, May 5, 1962, 9,001/62
7 Claims. (Cl. 103—53)

This invention relates to electromagnetic reciprocating pumps, and aims at increasing the capacity of such pump while at the same time reducing its external dimensions.

The pump of the present invention includes an annular magnetic core of U-shaped cross-section composed of a plurality of bowed laminae, so as to provide a hollow cylindrical core formed with an annular space wherein the energising winding is located. The shape of the core permits a reduction in the outside diameter of the pump, so as to allow use of the pump within deep and narrow bored wells, e.g. of only four inches in diameter. This was until now possible only with turbine pumps.

In the pump of this invention suction and compression are effected by a rubber spring, which also acts as an elastic suspension for the pump shaft, and as a seal between the pumping chamber and the space housing the driving mechanism of the pump.

A further feature of this invention is that the movable members of the pump are supported by two rubber springs, one of which is the spring mentioned above, which are preloaded during assembly within the pump, so that the natural vibration frequency of the pump is such that it is able to resonate with the frequency of the current energising the pump.

Another feature of this invention is that both the suction and compression valves are concentric, the first of which being in the form of an elastic frusto-conical member, which co-operates with a series of holes spaced apart along a circumference, and capable of opening said holes each time a sub-atmospheric pressure occurs within the pumping chamber, the second valve being constituted by a conical cap of elastomeric material, which covers externally a second series of circumferential holes which opens each time the pump makes a compression stroke.

Both valves are quickly and easily positioned by being held by a single element which is screw-threaded internally to the wall of the pumping chamber, which is shaped so that the compression valve is fastened to it by means of a tail piece integral with the valve, and which has in it the holes which are covered by the compression valve. The suction valve is held in place between a groove in the element and the wall of the pumping chamber.

In one embodiment of this invention the pump housing is bottle-shaped, the neck of the bottle constituting the port through which the compressed fluid is ejected, the housing being divided into three compartments held together by clasps, and of which one end compartment includes the pumping chamber of the pump, the middle one contains the electromagnetic drive of the pump, and the other end compartment contains a portion of the shaft and one rubber spring of the pump.

According to a further aspect of the invention the coil is enclosed between two concentric cylinders made of insulation material and which co-operate to provide spaces at one end of the coil, into which spaces the ends of the coil extend, electrical contact with the ends being effected by electrically conductive bolts of which the heads press against the coil ends and the shanks traverse the core to be connected externally of the core with an electric cable. The electric cable passes to the outside of the pump through an aperture in the pump housing, the aperture and cable being provided with a fluid-tight seal.

One example of the present invention is illustrated in the accompanying drawing, in which:
FIG. 1 is a cross-section along the axis of the pump;
FIG. 2 is a perspective view of a lamina for the core of the pump;
FIG. 3 is a perspective view of the lamina of FIG. 2 when bowed, and
FIG. 4 is a cross-section of the core of the pump with the winding removed.

Referring now to the drawing, the electromagnetic reciprocating pump has an annular magnetic core 1 made up from a plurality of stamped U-shaped laminae 2. Each lamina is bowed, as shown in FIGS. 3 and 4, when in position in the core, thus producing a hollow cylindrical body of U-shaped cross-section having a continuous web 3, an inner annular portion 4, an intermediate annular coil space 6, and an outer annular portion 5. The magnetic core composed in this manner is inserted into a cylindrical housing 7, preferably made of metal, which is an element of the housing of the pump as a whole.

Within the annular space 6 an electric coil 8 is located. The coil is insulated by two concentric insulating cylinders 9 and 10 which are provided with annular flanges which cover both ends of the coil. In certain regions the flanges are spaced apart axially of the core, as at 11, thus providing a space wherein the terminals of the coil extend and are thus protected, said terminals being constituted by a copper plate (not shown).

Over the core an insulating plate 13 is provided which is annular in shape and provided with a central hole. Bolts 14, of which only one is illustrated, traverse the core and are biased by springs (not shown) so that the bolt heads come into electrical contact with the ends of the coil.

The bolts 14 are insulated from the core by means of insulating sleeves 15.

Traversing the hole 12 in the core is the shaft 16 of the pump. On the lower portion of said shaft the armature 17 is located, facing the magnetic core, the armature also being annular, and constructed in the same manner as the core 1. Beyond the armature the shaft is fixed to a rubber bush 18 by means of a metal sleeve which is bonded to the bush and which is secured to a shaft 16 by means of a nut 19. A second similar rubber bush 20 is secured to the other end of the shaft, on the side of the plate 13 opposite to the core 1, by means of a nut 21.

These metal-bonded rubber bushes, of the type known in the motor vehicle industry, have several functions. They serve as elastic suspension members for the reciprocating members of the pump; to this end they are shaped and sized so as to receive during their assembly a pre-load in the axial direction so that the whole reciprocating system has a natural resonance frequency such that it is able to resonate with the alternating current driving the pump. This resonance frequency is twice the frequency of the network. The two bushes have in addition the function of constituting fluid-tight diaphragms for the pump. To this end they are provided with peripheral flanges 22 and 23, respectively, which are firmly engaged by lips 24 and 25 of the end portions of the pump housing.

The upper rubber spring or bush 20 also serves as the pumping member by forming one wall of the pumping chamber of the pump. When the spring is oscillated by reciprocation of the shaft 16, it alternately increases and decreases the volume of the pumping chamber. During each cycle it sucks in and then ejects a small quantity of fluid. There are 100 such cycles per second for an electric supply frequency of 50 c./s.

Spring 20 has at one side an entrance 27 for an electric cable which enters through a conduit 28 in the wall of a housing 29 containing the pumping chamber 26. The electric cable is hermetically sealed to the conduit and is electrically connected to the bolts 14 traversing the plate 13 and thereby with the coil 6.

The housing of the pump is constituted by the cylindrical casing 7, the housing 29, and a lower housing 30, both the latter being clamped in a fluid-tight manner to the casing 7.

The outside surface of the pump is circular in section and of a smaller diameter than known electromagnetic reciprocating pumps, so that the pump is able to be used within deep wells of four inches bore.

The whole pump is bottle-shaped, the housing 29 constituting the upper part and providing a bottle neck 31 acting as a port to which a pipe for the compressed fluid can be easily and quickly connected.

To the lower portion of the neck of the housing 29, and internally thereof, an element 32 is screw-threaded. The element 32 has a series of circumferential holes which open at one end in a frusto-conical seating surface for an elastomeric substantially conical valve 34 which is fastened to the element 32 by means of a tail piece 35. The valve 34 opens each time the pressure within chamber 26 increases sufficiently, thus permitting the compressed fluid to be ejected through the port 31. The element 32 is provided with a cylindrical groove 36 in which is seated the enlarged inner edge 37 of a second frusto-conical valve 38 secured between the element and the housing 29. The valve 38 is seated on a frusto-conical surface into which opens a second series of circumferential holes 39. The holes 39 are opened each time the pressure within the pumping chamber 26 reaches a sufficiently low value, thus permitting fluid to be drawn into the pumping chamber from the outside of the pump. The valves 34 and 38 are coaxial and their disposition enables the outlet port 31 to be concentric with the pump, so that the pipe for the compressed fluid can be used also to support the pump in its working position.

What I claim is:

1. A reciprocating pump adapted to be inserted in small diameter wells comprising, in combination, elongated cylindrical housing means closed at opposite ends; a pair of elastomeric diaphragm means extending spaced from each other transversely through and being fluid-tightly connected along peripheral edges thereof to said housing means and dividing the latter in a pair of end chambers and an intermediate chamber located between said end chambers, one of said end chambers forming a pumping chamber; electromagnetic vibratory motor means located in said intermediate chamber and having a reciprocating shaft extending in longitudinal direction of said housing means and begin fluid-tightly connected at spaced portions thereof to said diaphragm means, respectively, to be supported thereby for reciprocating movement in axial direction; inlet and outlet means formed in the closed end of the housing forming said one end chamber; and a pair of valve means respectively cooperating with said inlet and outlet means for opening and closing the latter.

2. A pump as claimed in claim 1 wherein said elastomeric diaphragm means are pretensioned.

3. A pump as claimed in claim 1 and including an electric cable for supplying said electromagnetic vibratory motor means with current, and passage means formed through said closed end of said one end chamber and through said elastomeric diaphragm means separating said one end chamber from said intermediate chamber, said cable extending through said passage means and being sealed to said diaphragm means.

4. A pump as claimed in claim 1, wherein each valve being of elastomeric material and having a frusto-conical portion co-operating with a frusto-conical seating surface in which is a series of apertures spaced apart along the circumference of a circle, in which one valve is seated in an element which is screw-threaded in said one wall of the pumping chamber, the other valve being gripped between said one wall and the element.

5. A pump as claimed in claim 4, in which the housing of the pump is in the shape of a bottle, the mouth of the bottle forming said outlet means and the neck of the bottle being provided with said apertures which form said inlet means.

6. A reciprocating pump adapted to be inserted in small diameter wells comprising, in combination, elongated cylindrical housing means closed at opposite ends; a pair of elastomeric diaphragm means extending spaced from each other transversely through and being fluid-tightly connected along peripheral edges thereof to said housing means and dividing the latter in a pair of end chambers and an intermediate chamber located between said end chambers, one of said end chambers forming a pumping chamber; electromagnetic vibratory motor means located in said intermediate chamber, said electromagnetic vibratory motor means including an annular magnetic core of U-shaped cross section and composed of a plurality of bowed laminae, in which a tangent at any point along the length of each lamina in a plane perpendicular to the axis of the core intersects the radius from the core axis to said point at an angle which increases as the radial length increases, the outer ends of said laminae abutting against the wall of said cylindrical housing means, a winding located in the annular space of said core insulated therefrom, an elongated shaft coaxial with said housing means extending through said core and being fluid-tightly connected at spaced portions thereof to said diaphragm means, respectively, to be supported thereby for reciprocation in axial direction, and an armature located adjacent one end of said core and fixed to said shaft for reciprocation therewith; inlet and outlet means formed in the closed end of the housing forming said one end chamber; and a pair of valve means respectively cooperating with said inlet and outlet means for opening and closing the latter.

7. A reciprocating pump adapted to be inserted in small diameter wells comprising, in combination, elongated cylindrical housing means closed at opposite ends; a pair of elastomeric diaphragm means extending spaced from each other transversely through and being fluid-tightly connected along peripheral edges thereof to said housing means and dividing the latter in a pair of end chambers and an intermediate chamber located between said end chambers, one of said end chambers forming a pumping chamber; electro-magnetic vibratory motor means located in said intermediate chamber, said electromagnetic vibratory motor means including an annular magnetic core of U-shaped cross section and composed of a plurality of bowed laminae, in which a tangent at any point along the length of each lamina in a plane perpendicular to the axis of the core intersects the radius from the core axis to said point at an angle which increases as the radial length increases, the outer ends of said laminae abutting against the wall of said cylindrical housing means, a winding located in the annular space of said core insulated therefrom, each end of said winding being contacted by a bolt which extends, and insulated from the core and which is connected to a electric cable, an elongated shaft coaxial with said housing means extending through said core and being fluid-tightly connected at spaced portions thereof to said diaphragm means, respectively, to be supported thereby for reciprocation in axial direction, and an armature located adjacent one end of said core and fixed to said shaft for reciprocation therewith; inlet and outlet means formed in the closed end of the housing forming said one end chamber; and a pair of valve means respectively cooperating with said inlet and outlet means for opening and closing the latter.

References Cited by the Examiner

UNITED STATES PATENTS

| | | | |
|---|---|---|---|
| 2,669,937 | 2/54 | Presentey | 103—53 |
| 2,809,589 | 10/57 | Randolph | 103—53 |
| 2,961,556 | 11/60 | Vance | 310—216 |
| 3,043,971 | 7/62 | Stevens | 310—216 |

FOREIGN PATENTS

| | | |
|---|---|---|
| 818,503 | 10/51 | Germany. |
| 440,693 | 1/36 | Great Britain. |

DONLEY J. STOCKING, *Primary Examiner.*

ROBERT M. WALKER, LAURENCE V. EFNER,
*Examiners.*